United States Patent [19]

Dell et al.

[11] Patent Number: 4,505,943

[45] Date of Patent: Mar. 19, 1985

[54] PROCESS FOR MAKING A FREEZE-THAW STABLE EDIBLE FOAM CONTAINING MILK FAT

[75] Inventors: William J. Dell, Howell, N.J.; Alexander A. Gonsalves, Yardley, Pa.; William E. Flango, Hamilton Square, N.J.

[73] Assignee: General Foods Corporation, White Plains, N.Y.

[21] Appl. No.: 627,508

[22] Filed: Jul. 9, 1984

Related U.S. Application Data

[63] Continuation of Ser. No. 446,282, Dec. 2, 1982, abandoned.

[51] Int. Cl.³ .................... A23C 13/14; A23G 9/02
[52] U.S. Cl. .................................... 426/565; 426/570
[58] Field of Search ............... 426/565, 566, 567, 570

[56] References Cited

U.S. PATENT DOCUMENTS

| | | | |
|---|---|---|---|
| 1,424,603 | 8/1922 | Turney | 426/565 |
| 1,434,070 | 10/1922 | Smith | 426/565 |
| 1,598,033 | 8/1926 | Zoller | 426/565 |
| 1,935,596 | 11/1933 | Fear | 426/565 |
| 2,856,289 | 10/1958 | Weinstein | 426/565 |
| 2,929,715 | 3/1960 | Sutton | 426/570 |
| 3,431,117 | 3/1969 | Lorant et al. | 426/565 |
| 3,968,267 | 7/1976 | Ogasa et al. | 426/570 |
| 4,012,253 | 3/1977 | Jonas | 426/565 |
| 4,251,560 | 2/1981 | Dell et al. | 426/565 |
| 4,370,353 | 1/1983 | Yagi et al. | 426/570 |

*Primary Examiner*—Jeanette Hunter
*Attorney, Agent, or Firm*—Thomas R. Savoie; Thomas A. Marcoux; Daniel J. Donovan

[57] ABSTRACT

A process for making a freeze-thaw stable frozen whipped topping containing milk fat. The process for making this topping comprises controlling the pH of topping ingredient admixture.

13 Claims, No Drawings

PROCESS FOR MAKING A FREEZE-THAW STABLE EDIBLE FOAM CONTAINING MILK FAT

This application is a continuation of application Ser. No. 446,282, filed Dec. 2, 1982, abandoned.

This invention relates to a process for preparing frozen whipped topping compositions. More particularly, it relates to a process for preparing frozen whipped topping compositions containing milk fat and which have an extended refrigerator shelf life after thawing. This composition is suitable for use as a whipped cream substitute and as a topping for desserts, icing for cakes and the like. Previously, frozen whipped toppings based upon milk fat (i.e., containing real cream) have generally had a very short shelf life, or poor eating qualities after thawing. These prior art samples became loose, soupy (soft, no resilience), open textured (grainy, webby) and exuded free liquid within hours after thawing in the refrigerator. Furthermore, freeze-thaw stability was generally accompanied by a heavy, thick mouthfeel, uncharacteristic of freshly whipped cream and even then the refrigerator stability was limited (i.e. 5 to 7 days). The present invention extends the refrigerator shelf life of the topping based upon milk fat for a period of 7 to 30 days or longer while maintaining the mouthfeel, texture and appearance characteristic of freshly whipped cream and represents an advance over the previously available frozen whipped toppings based upon milk fat.

While U.S. Pat. No. 3,431,117 by Lorant teaches how to prepare a stable frozen whipped topping, the specific problem of stabilizing a milk fat system is not dealt with. U.S. Pat. No. 4,251,560 issued to Dell et al. discloses a process for making a frozen whipped topping, wherein milk fat is the only lipid source, with an extended refrigerator shelf-life by using a modified starch.

Notwithstanding the advances made in the art, the production of milk fat containing frozen foams with an extended refrigerator shelf-life has remained problematic. To resolve these problems, various parameters of unstable foams were investigated. These investigations showed that refrigerator shelf life decreased with an increase in the acidicy of the foam.

Therefore, it is a feature of the present invention to provide a process to reduce the acidity of the foam so as to prepare a frozen whipped topping composition based upon milk fat, which composition has extended refrigerator shelf life after thawing.

A further feature of the present invention is to provide a whipped topping composition which upon thawing, has the attributes of freshly prepared whipped cream.

SUMMARY OF THE INVENTION

Briefly, the instant invention provides a process for preparing a frozen whipped topping comprising milk fat and having improved stability upon thawing and refrigerator storage comprising blending milk fat, emulsifiers protein, stabilizers, carbohydrate, water and either an alkalizing agent or a buffering agent, pasteurizing and homogenizing these ingredients to form an emulsion, cooling the emulsion, whipping the emulsion, and then freezing the emulsion. The amount of alkalizing agent or buffering agent added is effective to raise the pH of the combined foam ingredients to between about 6.3 and about 7.2. Upon thawing, the frozen whipped topping so prepared is characterized by its excellent volume, texture and eating properties, the superior storage stability after thawing, as well as the convenience offered to the consumer.

DETAILED DESCRIPTION OF THE INVENTION

The process of the present invention makes it possible to prepare a frozen whipped topping composition containing real cream which may be distributed and sold in a frozen state and which upon thawing retains its excellent volume, smooth, continuous, light and fluffy texture, and eating properties for an extended period of time. The thawed composition may be stored at refrigerated temperatures for a period of about 7 to 30 days or longer without an apparent loss in volume, texture and eating properties. Thus, the composition may be described as having exceptional freeze-thaw stability as well as extended stability upon thawing at refrigerated temperatures.

The unique and surprising characteristic of the present invention is the ability to employ real cream, i.e. milk fat, in the preparation of a frozen whipped topping which is stable upon thawing. The fat employed may be derived from real cream, butter fat, anhydrous milk fat or other milk fat sources. By the use of milk fat, the resultant topping imparts a fast meltdown in the mouth, thus providing a mouthfeel close to freshly prepared whipped cream.

Nonetheless, the milk fat can be used along or in any combination with any of the natural animal or vegetable fats or oils commonly employed in food products. Thus, any combination of edible oils, semi-solid or solid fats, can be employed. Such fats or oils may be fully or partially hydrogenated. Suitable fats include lard, modified lard, margarine, as well as various vegetable and animal oils. Additionally, oils such as coconut oil, palm kernel oil, cottonseed oil, peanut oil, olive oil, corn oil, soy oil, and the like may be utilized. Preferably, the non-milk fat is low melting and also has the desired melt-away characteristics at mouth temperatures. It is preferred that at least about 1% of the fat, by weight, is milk fat, and more preferably, at least about 6% of the fat is milk fat. It is further preferred that at least about 11% of the fat is milk fat and it is most preferred that at least about 20% of the fat is milk fat. However, it is preferred that at least about 25%, more preferably at least about 50%, and most preferably at least about 75%, of the lipid material used be non-milk fat.

The protein which may be employed may be any of a large group including non-fat milk solids, water soluble soy protein derivatives, egg albumen, gelatin, sodium caseinate, calcium caseinate, and the like, and mixtures thereof. The protein apparently serves to effect stabilization of the whipped topping composition.

Stabilizer, other than protein, is also desirably included in the frozen whipped topping composition. Such stabilizer is preferably a natural, i.e., vegetable, or synthetic gum, and may be, for example, carrageenan, xanthan gum, guar gum, alginate, and the like or carboxymethylcellulose, methylcellulose ether and the like, and mixtures thereof. However, modified starch may also be used.

A wide variety of emulsifiers may be employed in the compositions which are prepared by the process of this invention. Thus, hydroxylated lecithin, mono- or diglycerides of fatty acids such as monostearin and dipalmitin, polyoxyalkylene ethers of fatty esters of polyhydric alcohols such as the polyoxyethylene ethers of sorbitan monostearate or the polyoxyethylene ethers of sorbitan distearate; fatty esters of polyhydric alcohols, such as sorbitan monostearate; mono- and di-esters of glycols and fatty acids such as propylene glycol monostearate and propylene glycol monopalmitate; and partial esters of carboxylic acids such as lactic, citric, and tartaric acids with the mono- and di-glycerides of fatty acids such as glyceryl lactopalmitate and glyceryl lactooleate, and polyglycerol esters of fatty acids. The fatty acids employed in the preparation of the emulsifiers include those derived from beef tallow and coconut, cottonseed, palm, peanut, soybean and marine oils. Preferably, a combination of emulsifiers is employed, typically poly-oxyethylene sorbitan monostearate and sorbitan monostearate.

A carbohydrate is employed in the frozen whipped topping composition to provide bulk and the desired sweetness. Thus, sugars such as sucrose, dextrose, fructose, lactose, maltose, invert sugars, corn syrup, and mixtures thereof may be utilized as well as dextrins and low calorie sweeteners such as L-aspartic acid derivatives and saccharin.

The alkalizing agent of the instant invention may be any food grade material which is effective to raise the pH of the combined foam ingredients to a value greater than about 6.3, but less than about 7.2. Consequently, materials which are effective to buffer the combined foam ingredients at a pH greater than about 6.3 are also alkalizing agents. However, it is more preferred that the combined foam ingredients have a pH greater than about 6.5 and it is most preferred that the pH be greater than about 6.7.

Moreover, while any common food grade alkalizing agent may be employed, the preferred alkalizing agents are hydroxides, bicarbonates, and combinations thereof, and it is more preferred the the alkalizing agent cation be calcium, sodium, potassium, or combinations thereof. The most preferred alkalizing agents are selected from the group composed of sodium hydroxide, potassium hydroxide, sodium bicarbonate, potassium bicarbonate, and combinations thereof. Notwithstanding these preferences, a highly preferred alternative alkalizing agent is water which has been ion exchanged so that it is effective to raise the pH of the combined foam ingredients to within the range specified above.

If a buffering agent is used to achieve the desired pH, it is preferred that the buffer be a citrate, a phosphorous oxyacid salt, or a combination thereof. The preferred phosphorous oxyacid salts are phosphates, pyrophosphates, and combinations thereof. The preferred buffering agent cations are sodium, potassium, calcium, or combinations of these ions. The more preferred cations are sodium, potassium and combinations thereof.

As this invention improves the stability of those foams that are too acidic, it is desirable that the pH of the foam composition be determined prior to homoginzation. The means for determining the composition's pH may be any standard pH measurement technique. The frequency at which these pH determinations are made will depend upon the pH variability in the foam's individual ingredients. In sum, it is desirable to raise the pH of the foam composition when the composition's pH is less than about 6.3. However, it is more preferred that the composition's pH be raised if the composition's pH is less than about pH 6.5, and it is most preferred that the composition's pH be raised when the pH is less than about pH 6.7.

Other ingredients which may be included in the frozen whipped topping compositions prepared by the process of this invention are flavoring agents, colorants or dyes, vitamins, minerals, and the like. Suitable flavoring agents include vanilla, chocolate, coffee, maple, spice, mint, caramel, fruit flavors and flavor intensifiers (e.g. salt).

The amounts of milk fat, emulsifier, stabilizer, carbohydrate, and optionally included ingredients as well as the amount of water employed in the preparation of frozen whipped topping compositions according to the process of this invention can be varied over relatively wide limits. When homogenization of the composition using a pressure of at least 6000 p.s.i. (420 kg/cm$^2$) is employed, this allows considerable latitude in the amounts of the various ingredients. The amount of milk fat will be sufficient to provide a stable whipped topping which has good mouthfeel and yet, upon melting, does not leave an undesirable film on the palate. Sufficient amounts of modified starch, emulsifier, and stabilizer will be used to impart stability to the topping and to impart good whipping properties to the composition. Further, the amount of carbohydrate will be varied over a range sufficient to provide desired bulk and sweetness level in the finished topping composition. A preferred range of ingredients is as follows:

| Ingredients | Percent by weight |
| --- | --- |
| Fat (solids basis) | 10.0–30.0 |
| Milk fat | 0.1–22.5 |
| Non-milk fat | 7.5–29.9 |
| Protein | 0.5–3.5 |
| Emulsifier | 0.2–2.0 |
| Stabilizer (gum) | 0.02–2.0 |
| Water | 35.0–65.0 |
| Carbohydrate (sugar) | 15.0–35.0 |
| Flavoring Agent | 0.2–2.0 |
| Colorant | 0.01–0.05 |
| Alkalizing Agent | 0.0–0.1 |
| Buffering Agent | 0.0–1.0 |
| Modified starch | 0.0–1.0 |

The ingredients are blended in suitably desirable ratios to form a mix. Specifically, the emulsifier, gum, stabilizer, and carbohydrate components are dispersed in an aqueous media; the non-milk fat is added to the aqueous media; and this admixture is blended with a milk fat containing media. Additionally either an alkalizing agent or a buffering agent in an amount effective to bring the admixture's pH to between about 6.3 and about 7.3 is added to the other ingredients if without the alkalizing or buffering agent the admixture would have a pH less than about 6.3. The mix may then be heat pasteurized, i.e. subject to a sufficiently high temperature for a period of time effective to solubilize and disperse the ingredients of the mix, and kill all pathogens, e.g. at a temperature of about 150° F. (65° C.) to 165° F. (75° C.), for about 10 to about 30 minutes, or similar time-temperature relationships (e.g. high-temperature short time). The mix is then passed through a homogenizer of the typical dairy type. Although homogenization may be accomplished in one stage, for best results, homogenization is carried out in two stages, operated with the pressure maintained during the first stage preferrably at a minimum of 6000 p.s.i.g. (420 Kg/cm$^2$) and a maximum of about 10,000 p.s.i.g. (700 Kg/cm$^2$), preferably between about 7000 p.s.i.g. (490 Kg/cm$^2$) and about 7800 p.s.i.g., (550 Kg/cm$^2$) more preferably between about 7200 p.s.i.g. (500 Kg/cm$^2$) and about 7600 p.s.i.g. (530 Kg/cm²), and the second stage at a pressure of at least about 500 p.s.i.g. (35 Kg/cm²), more preferably at least about 550 p.s.i.g. (39 Kg/cm²). The mix temperature is usually maintained at a temperature of about 155° F. (70° C.) to 180° F. (80° C.) during homogenization. The emulsion is then cooled, e.g. to about 27° F. (−3° C.) to 45° F. (7° C.) and may be held at this temperature for a period of time sufficient to allow fat crystallization. The emulsion is then passed through a whipper for the incorporation of a gaseous medium, such as air or an inert gas, for example: nitrogen, carbon dioxide, nitrous oxide or the like. The whipper may be of conventional construction such as a Votator Continuous Recirculating Mixer (Trademark). The emulsion is whipped and aerated to between about 150% to about 350% overrun, preferably to between about 200% to about 300% overrun, and more preferably to between about 250% to about 300%, packaged and frozen.

The process of the present invention thus produces a frozen whipped topping composition containing milk fat which is stable and remains smooth after several freeze-thaw cycles. The frozen topping composition, upon thawing, has a prolonged refrigeration shelf life, while possessing the light, fluffy, smooth and continuous texture, mouthfeel, appearance, volume and eating quality characteristic of freshly prepared whipped cream. To use the frozen whipped topping composition, the product is defrosted, for example, by being left for 3½ hours (for an 8.0 ounce or 226 gram container) in the refrigerator. The composition after thawing is thus ready for immediate table use without the necessity of reconstitution or whipping.

In order to illustrate the present invention, but in no matter to restrict it, the following example is given:

EXAMPLE 1

The frozen topping composition was prepared containing the following ingredients:

|  | Percent by Weight |
|---|---|
| Heavy Cream (40% fat) | 14.1 |
| Water | 35.4 |
| Emulsifiers | 0.48 |
| Flavors & colors | 0.4 |
| Gums | 0.17 |
| Sucrose | 14.0 |
| Dextrose | 1.0 |
| Corn Syrup (D.E. 42) | 12.6 |
| Vegetable Oil | 20.34 |
| Sodium Hydroxide | 0.01 |
| Sodium Caseinate | 1.5 |
|  | 100.0% |

The vegetable oil and then the colors were added into a mixing vessel. Thereafter, the sodium hydroxide, which had previously been dispersed in the water, was added as an aqueous solution. Next, the cream and the emulsifiers were added. Thereafter, the dry ingredients and the carbohydrates were added. The ingredients were mixed together until solubilized and dispersed, the pH was determined to be about 6.8 and then the admixture was pasteurized at 155° F. (65° C.) for 15 minutes. During pasteurization, the flavors were added to the solubilized and dispersed ingredients. The pasteurized mix is then homogenized in two stages to form the emulsion. The first stage homogenization employing pressures of about 7400 p.s.i.g. (520 Kg/cm²) and the second stage employing pressures of 600 p.s.i.g. (42 Kg/cm²). The homogenized mix is then cooled for 20 minutes at a temperature of 38° F. (3° C.). The cooled mix is then whipped and aerated to an overrun above about 250%. The whipped mix is then packaged and frozen.

The composition so prepared is characterized by its excellent freeze-thaw stability even after several freeze-thaw cycles. After thawing and storage at refrigerator temperatures (about 40° F., 5° C.) for 5 days and longer, the texture remained light, fluffy, continuous and smooth and did not become loose, soupy (no resilience), open textured (grainy, webby), or exude free liquid. Over the five days of refrigeration storage, the thawed topping composition maintained a mouthfeel, texture, volume, appearance and eating quality characteristic of freshly prepared whipped cream.

EXAMPLE 2

Disodium phosphate, 0.1% by weight, is used in the process of Example 1 instead of the sodium hydroxide to make a milk fat containing foam topping.

EXAMPLE 3

The procedure of Example 1 was followed, without the addition of an alkalizing agent. As a result, the ingredient admixture had a pH of 6.2. This admixture was processed according to subsequent steps of Example 1. The product became noticeably different, i.e. softer and weaker in texture, within 2 days and became soft and soupy within 6 days of being thawed and stored in a refrigerator.

What is claimed:

1. A process for making a frozen, milk fat-containing edible whipped topping, said whipped topping being both freeze-thaw stable and refrigerator stable after thawing for a period of at least seven days, comprising the steps of:
    (a) preparing an admixture comprised of from 35 to 65% by weight water, from 10 to 30% by weight fat, wherein at least about 11% of the fat is milk fat and at least about 50% of the fat is non-milk fat, from 0.5 to 3.5% by weight protein, from 0.02 to 2% by weight gum stabilizer, emulsifier, sweetner and an alkalizing or buffering agent, wherein said admixture in the absence of said alkalizing or buffering agent has a pH of below 6.3 and said alkalizing or buffering agent is present at a level effective to raise the pH of the admixture to greater than about 6.5 but less than 7.2;
    (b) pasteurizing the pH adjusted admixture;
    (c) homogenizing the pH adjusted admixture at a pressure of at least 6000 psi so as to form an emulsion;
    (d) whipping and aerating said emulsion to an overrun of between about 200% and about 300%;
    (e) cooling the aerated emulsion; and
    (f) freezing the aerated emulsion.

2. A process according to claim 1 which further comprises a second homogenization of the homogenized emulsion before whipping.

3. A process according to claim 2 wherein the second homogenization is at a pressure of at least about 500 p.s.i.g.

4. A process according to claim 1 which further comprises the step of cooling the homogenized emulsion to a temperature within the range from about 27° F. to about 45° F.

5. A process according to claim 1 wherein the alkalizing agent is selected from the group composed of hydroxides, bicarbonates, and combinations thereof.

6. A process according to claim 5 wherein the alkalizing agent cation is selected from the group consisting of calcium, sodium, potassium and combinations thereof.

7. A process according to claim 1 wherein the admixture contains as an alkalizing agent water, said water being pH adjusted by an ion exchange procedure.

8. A process according to claim 1 wherein the added alkalizing or buffering agent is effective to produce a pH of at least about 6.7.

9. A process according to claim 1 wherein the admixture contains a buffering agent selected from the group consisting of citrates, phosphorous oxyacid salts, and combinations thereof.

10. A process according to claim 9 wherein the phosphorous oxyacid salts are selected from the group consisting of phosphates and pyrophosphates.

11. A process according to claim 9 wherein the buffering agent cation is selected from the group consisting of calcium, potassium, sodium and combinations thereof.

12. A process according to claim 9 wherein the buffering agent cation is selected from the group consisting of potassium, sodium, and combinations thereof.

13. The process of claim 1 wherein at least 75% of the fat is non-milk fat.

* * * * *

UNITED STATES PATENT AND TRADEMARK OFFICE
CERTIFICATE OF CORRECTION

PATENT NO. : 4,505,943

DATED : Mar. 19, 1985

INVENTOR(S) : Dell et al.

It is certified that error appears in the above-identified patent and that said Letters Patent are hereby corrected as shown below:

On the title page;

In the heading, four additional inventors should be listed as follows:

Thomas E. Guhl, Plainsboro, N.J.;
Lawrence H. Freed, Plainsboro, N.J.;
John T. Oppy, Allentown, N.J.;
Suzanne Baratta, Arlington, Mass.

Signed and Sealed this

Twentieth Day of August 1985

[SEAL]

Attest:

DONALD J. QUIGG

Attesting Officer

Acting Commissioner of Patents and Trademarks